United States Patent Office 3,413,206
Patented Nov. 26, 1968

3,413,206
PROCESS FOR THE MANUFACTURE OF
2,2,3-TRICHLOROBUTANE
Kurt Sennewald and Wilhelm Vogt, Knapsack, near Cologne, and Herbert Baader, Hermulheim, near Cologne, Germany, assignors to Knapsack Aktiengesellschaft, Knapsack, near Cologne, Germany, a corporation of Germany
No Drawing. Filed Oct. 12, 1965, Ser. No. 495,343
Claims priority, application Germany, Oct. 21, 1964, K 54,305
12 Claims. (Cl. 204—163)

ABSTRACT OF THE DISCLOSURE

A process for producing 2,2,3-trichlorobutane by reacting 2,3-dichlorobutane with chlorine in the presence of light irradiation at a temperature of about 0° to −80° C.

---

The present invention relates to a process for the manufacture of 2,2,3-trichlorobutane by reacting 2,3-dichlorobutane with chlorine with exposure to light.

2,2,3-trichlorobutane is an important starting product for making chloroprene.

It is known that 2,2,3-trichlorobutane can be prepared by an additive combination of chlorine with 2-chlorobutene-(2). The chlorination of butene-(2) or butane incurs the formation of a mixture of isomers, which inter alia include small proportions of 2,2,3-trichlorobutane. During the chlorination of meso-2,3-dichlorobutane with exposure to light radiated by a 100 watt lamp, it was observed that 2,2,3-trichlorobutane did first form as the principal product in addition to 1,2,3-trichlorobutane (cf. Beilstein, vol. I, supplement III, page 285).

However, these conventional processes incur disadvantages. By chlorinating butane and butene-(2), 2,2,3-trichlorobutane is either obtained as by-product or considerable proportions of by-products, such as 1,2,3-trichlorobutane, which are difficult to utilize, are obtained concurrently therewith.

The preparation of 2,2,3-trichlorobutane by subjecting 2,3-dichlorobutane to catalytic dehydrochlorination followed by chlorination of the 2-chlorobutene-(2) initially formed is a complicated procedure which involves two processes stages which both produce considerable difficulties. For example, dehydrochlorination of 2,3-dichlorobutane in the presence of a $BaCl_2$/active carbon catalyst incurs resinification of the catalyst after a short reaction period, and the catalyst activity decreases. Yields are therefore poor. The successive chlorination of 2-chlorbutene-(2) with exclusion of light produces 2,2,3-trichlorobutane in a yield as low as 77%.

Another process necessitates adding $NaHCO_3$ during the chlorination, which is continuously consumed. The by-products obtained in this process are useless. The chlorination of pure meso-2,3-dichlorobutane is said to incur the formation of 2,2,3-trichlorobutane as the principal product, but no yield data have been indicated, and 1,2,3-trichlorobutane was obtained as a by-product.

Meso-2,3-dichlorobutane as a commercial intermediate is difficult to obtain. Investigations have therefore been made on the chlorination of a mixture comprising d-, l- and meso-2,3-dichlorobutanes. This mixture is obtained upon the additive combination of chlorine with a mixture of cis- and trans butenes-(2). The substituting chlorination with exposure to ultraviolet light then results in good yields of 2,2,3-trichlorobutane.

In accordance with the present invention, the chlorination is carried out at low temperatures, preferably at a temperature between 0 and −80° C. The yields of 2,2,3-trichlorobutane are the higher the lower the chlorination temperature, naturally with reduced conversion rates. For example, liquid chlorine can be dissolved in liquid 2,3-dichlorobutane at low temperatures with no conversion being observed. The reaction is initiated not earlier than upon exposure to ultraviolet light. Only after an induction period during which the solution is likely to become saturated primarily with hydrogen chloride, is it possible to observe vivid evolution by hydrogen chloride gas.

The process can be carried out either continuously by dissolving chlorine in an excess of 2,3-dichlorobutane and then causing the solution to flow past an UV-lamp, or discontinuously by first introducing 2,3-dichlorobutane into a container and then adding, e.g. at −50° C. and with exposure to light, about 40–80% of the amount of chlorine theoretically required. The reaction can be carried out to ensure a practically quantitative chlorine conversion. Reaction product leaving the chlorinating chamber may contain unreacted chlorine, if the sojourn time of the reaction mixture in the container is too short. Such chlorine can be expelled together with dissolved hydrogen chloride by injecting nitrogen and/or air. It is also possible to remove unreacted chlorine by additive combination with an unsaturated hydrocarbon. To this end, the reaction mixture is conveniently introduced into butene-(2) or inversely, with the resultant formation of the starting product, i.e. 2,3-dichlorobutane, from chlorine and butene-(2).

The reaction product contains 2,2,3-trichlorobutane, unreacted 2,3-dichlorobutane and in addition thereto higher boiling products including traces of 1,2,3-trichlorobutane The chlorination of 2,3-dichlorobutane unexpectedly produces yields considerably better than those obtained by conventional processes with the proviso that the reaction temperature is reduced as suggested in this invention so as to permit substitution by radiation with ultraviolet light. This effect could not be foreseen in view of the fact that F. F. Rust and W. E. Vaughan (J. Org. Chem., vol. 6, pages 479 et seq. (1941)) teach that upon chlorinating monochlorinated hydrocarbons in the vapor phase the presence of a Cl-atom has been found to impede substituting a hydrogen atom at the adjacent C-atom, whereas disubstitution and trisubstitution on the C-atom already linked to chlorine is scarcely influenced. In order to obtain good yields, one would therefore have been expected to carry out the chlorination in the vapor phase above 120° C. i.e. at the boiling point of 2,3-dichlorobutane, so as to repress the formation of 1,2,3-trichlorobutane and hence to increase the yield of 2,2,3-trichlorobutane. But the chlorination of 2,3-dichlorobutane in this suggested temperature range gave 2,2,3-trichlorobutane in yields as low as about 40%. In clear contrast thereto, the process of the present invention enables increased yields to be obtained by chlorination in the liquid phase at fairly low temperatures.

The advantage offered by the present process is seen to reside in the fact that there can be chlorinated not only meso-2,3-dichlorobutane, but also a mixture of d-, l- and meso-dichlorobutanes.

As opposed to these conventional methods for making 2,2,3-trichlorobutane from 2,3-dichlorobutane, the present invention permits obtaining the desired final product in a single stage in better yields.

The present invention provides more especially a process for the manufacture of 2,2,3-trichlorobutane by reacting 2,3-dichlorobutane with chlorine with exposure to light, which comprises carrying out the reaction at a temperature within the range of 0 to −80° C., preferably at −20 to −50° C.

The reaction material is conveniently exposed to ultraviolet light. It is advantageous continuously to dissolve chlorine in a molar excess of 2,3-dichlorobutane, to expose the resulting mixture to ultraviolet light, continuously to withdraw reaction product, substantially to free the reaction product from hydrogen chloride by injecting an inert gas, which is preferably nitrogen, and to distill the reaction product.

It has also proved advantageous to add to 2,3-dichlorobutane a 40–80% proportion of the chlorine needed to ensure a stoichiometric conversion, to expose the mixture to radiation of ultraviolet light, substantially to free the reaction product from hydrogen chloride and unreacted chlorine by injecting an inert gas, which is preferably nitrogen or air, and to distill the reaction product.

The inert gas can be introduced into an unsaturated hydrocarbon, advantageously butene-(2), which is intended to absorb hydrogen chloride and chlorine. It is also possible intimately to mix the reaction product with an unsaturated hydrocarbon, preferably with butene-(2), so as to thereby remove hydrogen chloride and chlorine rather than by blowing out and to distill the resulting mixture.

From an economical point of view, it is most convenient to chlorinate a mixture of d-, l- and meso-2,3-dichlorobutanes.

The following examples serve to illustrate the process of the present invention.

EXAMPLE 1

2 kg. 2,3-dichlorobutane were introduced into a 2 liter flask equipped with stirrer, thermometer and a 70 watt mercury high-pressure burner. 7.5 mols 95% 2,3-dichlorobutane and 3 moles chlorine were continuously added per hour near the bottom portion of the flask. The temperature in the flask was maintained at −30 to −40° C. Reaction product was removed at the upper flask portion, substantially freed from HCl by injecting nitrogen, and then introduced into a distilling column. The product obtained at the head portion of the distilling column (115–120° C.) consisted of unreacted 2,3-dichlorobutane. The sump phase was conveyed to a second column and 2,2,3-trichlorobutane was removed overhead at a temperature of 140–145° C. A total of 24,030 grams 95% ($\triangleq$ 22,828 grams 100%) 2,3-dichlorobutane was used within 24 hours. After conversion and distillation there were obtained 16,730 grams 2,3-dichlorobutane and 6,791 grams 2,2,3-trichlorobutane. The rate of conversion was 27%, and 2,2,3-trichlorobutane was obtained in a yield of 87.5%, referred to the 2,3-dichlorobutane which underwent conversion.

EXAMPLE 2

A 70 watt mercury high pressure burner 2 cm. wide and 30 cm. long was placed in a reactor about 35 cm long and 2.5 cm wide. The lamp was provided with a directly adjacent thermometer. 2,3-dichlorobutane and chlorine were introduced into the reactor in the molar ratio of 1:0.43 to 1:0.53. The reaction product leaving the reactor was blown out with nitrogen, and the reaction gases entrained by the nitrogen stream were introduced into butene-(2) with the result that unreacted chlorine combined additively in conventional manner with the butene-(2) to give 2,3-dichlorobutane. The liquid reaction product was distilled and the yield of 2,2,3-trichlorobutane, referred to the 2,3-dichlorobutane which underwent conversion, was determined gas chromatographically. The chlorination reactions were carried out at different temperatures. The results obtained are indicated in the following table.

| Temperature, °C. | 2,3-dichlorobutane conversion rate in percent | 2,2,3-trichlorobutane yield in percent, referred to 2,3-dichlorobutane transformed |
| --- | --- | --- |
| −25 | 17 | 90 |
| −20 | 20 | 84 |
| +20 | 23 | 74 |
| +30 | 20 | 74 |
| +80 | 19 | 68 |
| +90 | 21 | 62 |
| +120 | 36 | 39 |
| +150 | 27 | 36 |

EXAMPLE 3

768 grams 2,3-dichlorobutane were introduced into a 1 liter flask and, while radiating with a 70 watt mercury high pressure burner, chlorine was introduced at −50° C. for a period sufficient to transform about 50% of the 2,3-dichlorobutane used. The reaction product was found to contain 468 grams 2,2,3-trichlorobutane, corresponding to a yield of 94.7%.

We claim:
1. A process for the manufacture of 2,2,3-trichlorobutane by reacting 2,3-dichlorobutane and chlorine with exposure to light, which comprises carrying out the reaction at a temperature of about 0 to −80° C.

2. A process as claimed in claim 1 wherein the reaction is carried out at a temperature of about −20 to −50° C.

3. A process as claimed in claim 1 wherein the reaction is carried out while exposed to ultraviolet light.

4. A process as claimed in claim 1 wherein chlorine is continuously dissolved in a molar excess of 2,3-dichlorobutane, the resulting mixture is exposed to the action of ultraviolet light, reaction product is continuously withdrawn, substantially freed from hydrogen chloride by injecting an inert gas, and the reaction product is utimately distilled.

5. A process as claimed in claim 4 wherein the inert gas is nitrogen.

6. A process as claimed in claim 1 wherein a 40 to 80% proportion of the chlorine needed to achieve a stoichiometric conversion is added to 2,3-dichlorobutane, the resulting mixture is exposed to the action of ultraviolet light, reaction product is substantially freed from hydrogen chloride and unreacted chlorine by injecting an inert gas, and the reaction product is distilled.

7. A process as claimed in claim 6 wherein the inert gas is at least one member selected from the group consisting of nitrogen and air.

8. A process as claimed in claim 6 wherein the inert gas stream is introduced into an unsaturated hydrocarbon intended to absorb hydrogen chloride and chlorine.

9. A process as claimed in claim 8 wherein butene-(2) is used as the unsaturated hydrocarbon.

10. The process of claim 1 comprising admixing 40–80% of a stoichiometric amount of chlorine with 2,3-dichlorobutane, exposing the mixture to ultraviolet light and admixing the resulting reaction product with an unsaturated hydrocarbon to effect removal of hydrogen chloride by-products and chlorine reactant and separating the resulting mixture by distillation.

11. A process as claimed in claim 1 wherein a mixture of d-, l- and meso-2,3-dichlorobutanes is chlorinated.

12. A process as claimed in claim 10 wherein butene-(2) is used as the unsaturated hydrocarbon.

References Cited

UNITED STATES PATENTS 1,191,916   7/1916   Brooks et al. _____ 204—163
2,948,667   8/1960   Limido et al. _____ 204—163

HOWARD S. WILLIAMS, *Primary Examiner.*